United States Patent [19]

Smith

[11] Patent Number: 5,316,352
[45] Date of Patent: May 31, 1994

[54] PIPE COUPLING

[76] Inventor: Michael S. Smith, 240 Templewood Place NE., Calgary, Alberta, Canada, T1Y 4A8

[21] Appl. No.: 807,237

[22] Filed: Dec. 16, 1991

[51] Int. Cl.⁵ .............................................. F16L 21/02
[52] U.S. Cl. .................................... 285/370; 285/371; 285/397; 405/184
[58] Field of Search ............... 285/397, 398, 370, 371, 285/100, 101, 95; 405/184

[56] References Cited

U.S. PATENT DOCUMENTS

| 381,869 | 4/1888 | Williams | 285/371 X |
|---|---|---|---|
| 545,877 | 9/1895 | Curlett | 285/371 X |
| 909,029 | 1/1909 | Schmidt | 285/370 X |
| 1,810,825 | 6/1931 | Furrer | 285/397 X |
| 3,360,283 | 12/1967 | Guthrie | 285/110 |
| 3,458,219 | 7/1969 | Wesch | 285/370 X |
| 3,476,413 | 11/1969 | Coberly et al. | 285/370 X |
| 3,967,841 | 7/1976 | Kendrick et al. | 285/371 X |
| 4,621,838 | 11/1986 | Kneidel et al. | 285/371 X |
| 4,693,502 | 9/1987 | Oetiker | 285/371 X |
| 5,129,689 | 7/1992 | Newski et al. | 285/398 X |

FOREIGN PATENT DOCUMENTS

| 635412 | 1/1962 | Canada . | |
|---|---|---|---|
| 869429 | 4/1971 | Canada . | |
| 877834 | 8/1971 | Canada . | |
| 1029416 | 4/1978 | Canada . | |
| 2149345 | 4/1972 | Fed. Rep. of Germany | 285/370 |
| 0641662 | 8/1928 | France | 285/397 |
| 0788659 | 10/1935 | France | 285/371 |
| 0543075 | 6/1957 | Italy | 285/371 |
| 0469466 | 4/1969 | Switzerland | 285/397 |
| 0235652 | 6/1925 | United Kingdom | 285/371 |
| 0289902 | 5/1928 | United Kingdom | 285/371 |
| 0411821 | 6/1934 | United Kingdom | 285/371 |
| 1232938 | 5/1971 | United Kingdom | 285/371 |
| 2000240 | 1/1979 | United Kingdom | 285/370 |

Primary Examiner—Randolph A. Reese
Assistant Examiner—Heather Chun
Attorney, Agent, or Firm—George Dunsmuir

[57] ABSTRACT

A method and apparatus for coupling pipe, and installing coupled pipe in a trenchless installation, the pipe being adapted for use as a watermain or the like. Lengths of watermain pipe are provided with a bell at each end, and connecting nipples adapted to be received within opposing bells, to effect a fluid-tight seal. As lengths of watermain are urged into a trenchless tunnel, opposing bell-end faces withstand the force being exerted on the pipe sections, so that damage is avoided and a sealed underground pipe installation is economically and quickly effected.

9 Claims, 9 Drawing Sheets

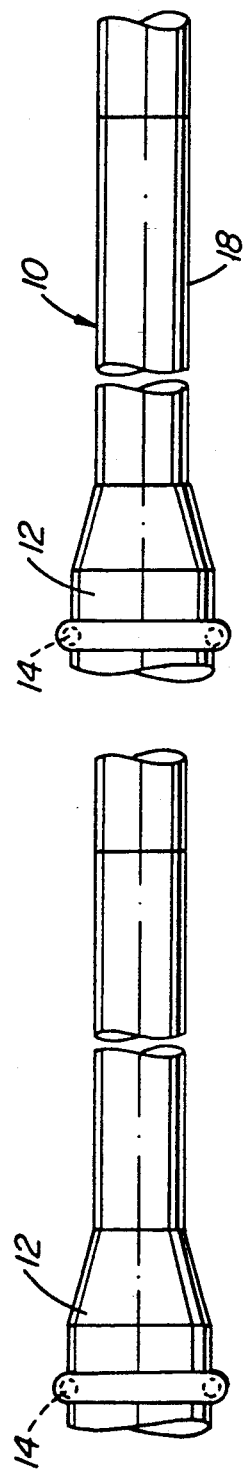
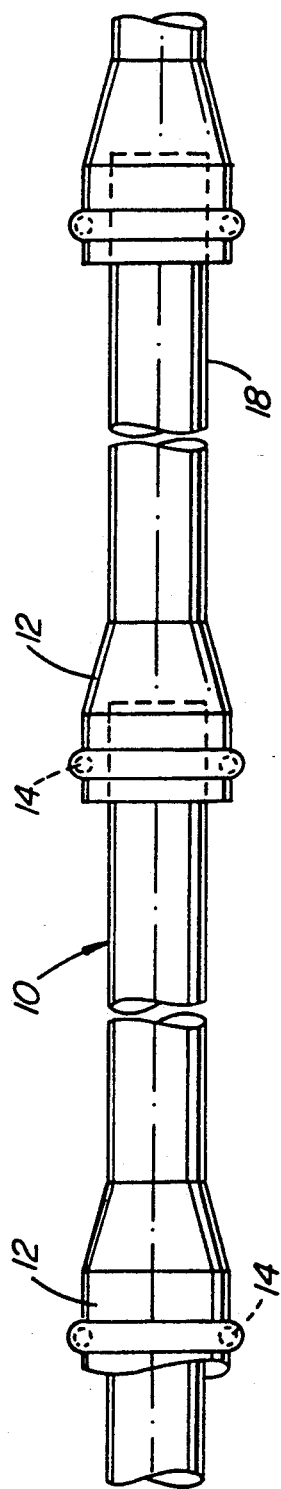
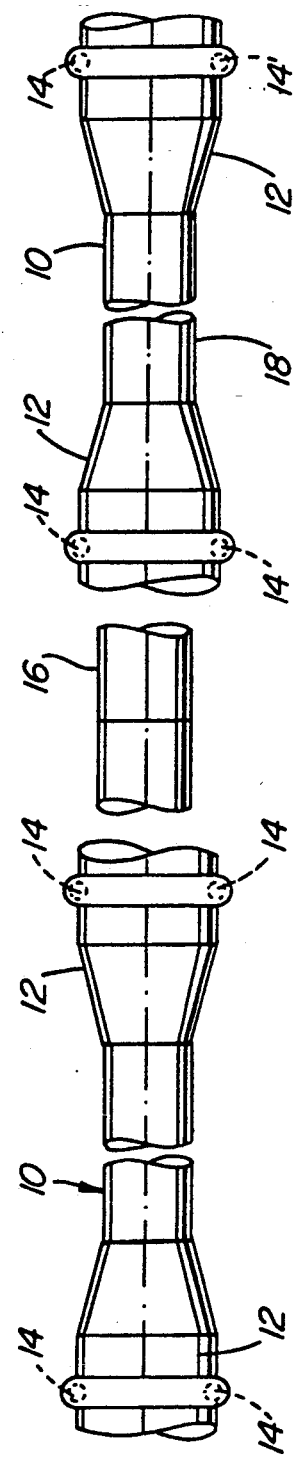
FIG. 1 PRIOR ART
FIG. 2 PRIOR ART
FIG. 3

PIPE COUPLING

BACKGROUND OF THE INVENTION

It is unfortunately common in urban environments for large sections of the streets to be dug up periodically to replace aged and leaking underground piping, or to install new piping. The cost is great even figured solely on manpower and equipment; much greater when snarled traffic (and public aggravation) is included. Trenchless pipeline installation avoids many of the problems listed, but to date the standard widely-used plastic components for water and sewer mains, having bell and spigot joints, have not been appropriate for trenchless use. They become damaged at the joints if attempted to be pipe-jacked (pushed or pulled into the hole). The present invention ingeniously allows these common components to be installed without damage.

This allows for a great cost saving since before the present invention more expensive pipes joined by more expensive techniques were necessary in trenchless applications. Thus with the present invention the public is likely to get home from work more quickly and find a smaller tax bill in the mail box.

SUMMARY OF THE INVENTION

In brief, the invention is as follows: instead of the bell and spigot joint which is now widely used in standard PVC (polyvinyl chloride) watermain and sewer pipe, the inventor has specified the same pipe but with bells on both ends. This calls for no factory retooling, merely a labour motion of turning the pipe during manufacture. During pipe-jacking according to the invention, two pipes are placed end-to-end, the bells line up exactly, and the bells transfer the longitudinal load smoothly. A separate piece of straight (bell-less) pipe, or nipple, has at this point been installed inside the pipes at the joint, and makes liquid-sealing contact against gaskets inside the bells. These gaskets are already part of the bell-formation process since they are an integral part of the original bell and spigot connection. Now however, two gaskets are flush against the nipple instead of one against a spigot.

The invention resides in the fact that the force of pipe-jacking is not transmitted through the nipple, which is completely isolated from this force. In common PVC bell and spigot configurations, pipe-jacking above a certain short distance causes the spigot and/or its matching bell, to be damaged eventually causing a rupture. A square-shouldered bell might accommodate this, but would be more difficult to make and requires modification of existing manufacturing equipment disproportionate to the size of the market for trenchless installation.

In minor variations, the inventor has also devised a bearing ring which can be placed around the nipple between the bells, to ensure no abrasion of the bell surfaces during installation; a bearing and anchor-ring that will also prevent lateral movement of the nipple (wherein a groove is scored in the nipple to hold the ring); and a custom-molded nipple that contains its own bearing ring and is hence anchored. In all cases the essential bell-to-bell load-bearing of the invention prevails.

A search of the relevant prior art has revealed only pipe-coupling inventions that have a superficial visual resemblance to the present invention, but were not intended for trenchless applications. On examination they can easily be shown to suffer from the same serious flaw as the common bell and spigot PVC: a rupture would be caused with the heavy end-loading required for trenchless installation. For example, Canadian Patent No. 877,834 (Ellay Enfield) is superficially similar but designed for a different purpose: for the provision of end restraint on pipes installed by conventional means. Any applied end-load would be borne on curved surfaces, and would crack in exactly the same manner as common bell and spigot PVC. As well, the components are not standard, requiring extensive retooling; and the clip system would dislodge during installation. Finally the size of the pipeline would be determined by the size (nominal inside diameter) of the nipples, rather than the size of the pipe itself.

Similarly, with the other prior art:

Canadian Patent No. 1,029,416 (Dupont) is intended for repair; Canadian No. 869,429 (A.M.F.) is designed for welding of steel pipe; Canadian No. 635,412 is for threaded metal couplings. In all the foregoing the essential features of this invention are not addressed; 1) they do not isolate the spigot component of the coupling from the pushing force necessary for pipe-jacking or other trenchless pipeline replacement installations; 2) They do not employ existing standard production coupling components. Finally, in U.S. Pat. No. 3,360,283 (Guthrie), the diameter of the line would be governed by the diameter of the nipple rather than the pipeline itself, and the components are all non-standard relative to existing sewer and water line specifications, necessitating extensive retooling. The stated use of the Guthrie patent is "circuits requiring frequent assembly and disassembly, such as agricultural circuits," and also where "limited space is normally available for installation such as in heating and air conditioning ducts", the question of trenchless end-loaded installation is not contemplated or addressed.

One object of the present invention is to provide a method and apparatus for pushing jointed pipe comprising:

(a) a plurality of substantially identical lengths of pipe with integral extruded annular flanges, called bells, on both ends, such that the maximum inside diameter of the bell is greater than the outside diameter of the body of the pipe;

(b) a similar plurality of substantially identical nipples, being shorter lengths of straight pipe, positioned such that there is one nipple inserted between two opposing bells when the longer pipe lengths are coupled end to end; said nipples being bevelled on both ends, and said nipples being shorter in length than the shortest distance between the two inside sloping surfaces of said opposing bells when the ends of the opposing bells are annularly touching; said sloping surfaces being the connecting surface between the maximum inside diameter of bell and minimum inside diameter of the body of the pipe;

(c) a means of forming an annular seal between the outer surface of the nipple and the inner surface of the bell; said seal being appropriate to contain inside the pipe whatever is being transported in the pipe;

(d) a means for longitudinally pushing the end of the coupled line of pipes, or pipeline; said means having sufficient force to move the entire pipeline longitudinally; and (e) means for positioning subsequent nipples and pipes onto the penultimate pipe.

Another object of the invention is to provide a method and apparatus for pushing jointed pipe such as just described in (a) through (e), except that an annular ring, called a bearing ring, is placed between the outer surfaces of the two opposing bells in the coupling, for the purposes of preventing abrasion between said surfaces during installation; said beaing ring being designed so as to effectively transmit the longitudinal pushing force from bell surface.

Another object of the invention is to provide a similar method and apparatus for pushing jointed pipe as that just described in (a) through (e), except that instead of the annular ring just described, an annular groove is machined in the outer surface of the nipple, and an annular ring, called a retainer ring, fashioned to fit securely in the groove; said secure fit in the groove being sufficient to prevent lateral movement of the nipple during installation.

Another object of the invention is to provide a similar method and apparatus for pushing jointed pipe as that just described in (a) through (e), except that instead of the separate retainer ring just described, the nipples are fashioned as a single piece with an annular ring extending outwards from their lengthwise midpoint.

A further object of the invention is to provide a means of coupling PVC, that is polyvinyl chloride, gasket-jointed AWWA, that is American Water Works Association, Standard C-900 and CSA B137.3M86 watermain pipe in trenchless installation, comprising:

(a) obtaining said watermain pipe appropriate in diameter and length for the installation being performed, except manufactured with standard bells with standard annular gaskets on both ends instead of on one end only;

(b) obtaining for each length of said watermain pipe one nipple, being a bell-less shorter length of AWWA Standard C-900 watermain pipe; said nipples being bevelled on both ends; said nipples being shorter in length than the shortest distance between the two inside sloping surfaces of opposing bells when the ends of bells of two lengths of longer pipe are annularly touching; outside unbevelled surface of said nipples being longer in length than the shortest distance between one side sloping surface of one bell and the gasket in the opposing bell; said sloping surfaces being the connecting surface between the maximum inside diameter of bell and the minimum inside diameter of the body of the pipe;

(c) installing the first length of said double-belled standard C-900 watermain pipe into the intended watermain tunnel using known techniques, such that one bell end is still outside the tunnel;

(d) inserting a nipple into said bell end, such that its outside unbevelled surface extends farther than the gasket in said bell end but not so far as to contact the inside sloping surface of said bell end;

(e) placing another length of double-bell-ended pipe over the extending nipple using known techniques, and maneuvering it, using known techniques, towards the penultimate pipe so that ultimately the bell-end faces of the two pipes touch;

(f) applying tape, including but not limited to common duct tape, annularly around the joint of the two opposing bell-faces to prevent dirt entry into the joint.

(g) pushing against the open end of the last pipe, using known techniques, such that the two pipes move longitudinally into the tunnel;

(h) repeating steps (d) through (g) of the description until the end pipe has been inserted into the tunnel to complete the length of pipeline desired. These examples are by way of illustration only, and the process is intended to work equally well with any type of end-loaded installation of jointed tubes.

To the inventor's knowledge, there is no prior art that solves the problem of common component end-loaded installation in a similar manner; therefore, the invention may have applications outside the existing specific use to be described. For this reason, the reader is advised that the contexts discussed in this introduction and the more detailed description to follow are by example only and in no way are intended to limit the scope of the appended claims.

BRIEF DESCRIPTION OF THE DRAWINGS

In the following description, reference will be made to the accompanying drawings in which:

FIG. 1, a typical bell and spigot gasket-seal joint according to prior art, unassembled;

FIG. 2, a typical bell and spigot gasket-sealed joint according to the present invention; assembled;

FIG. 3, a bell, bell, nipple gasket-sealed joint according to the present invention; unassembled;

DESCRIPTION OF THE PREFERRED EMBODIMENT

Figure 4:
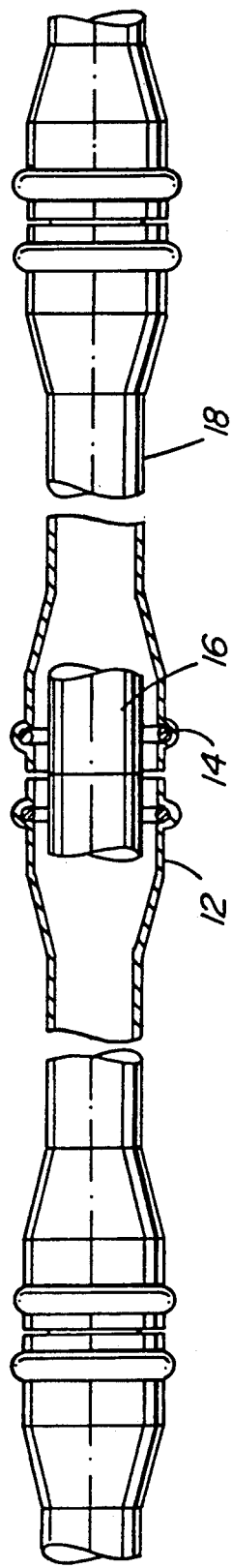
FIG. 4, a bell, bell and nipple gasket-sealed joint according to the present invention; assembled.

Detailed reference will now be made to the drawings in which like reference numerals will identify like parts.

In a first version of the invention, trenchless installation of PVC watermain pipe made to the American Water Works Association (AWWA) Standard C-900

(also CSA B137.3M86) will be described. This is the predominant type of pipe currently used in municipal watermain installations throughout Canada and the U.S.A. It should be understood that the invention is also applicable to trenchless installations of any suitable pipe with bell and spigot joints with annular gasket seals, for example, standard PVC sewer pipe (ASTMD3034, F697; CSA B183.1, B182, known as "PSM" type).

Referring to FIG. 3, an adequate number of AWWA Standard C-900 watermain pipes 10 are ordered manufactured with bells 12 on both ends. Inside each bell is annular gasket 14. Enough pipe is obtained for the complete length of the job being considered. For each pipe is also obtained a short length of pipe 16, also called nipple, with spigot on both ends.

Figure 5:
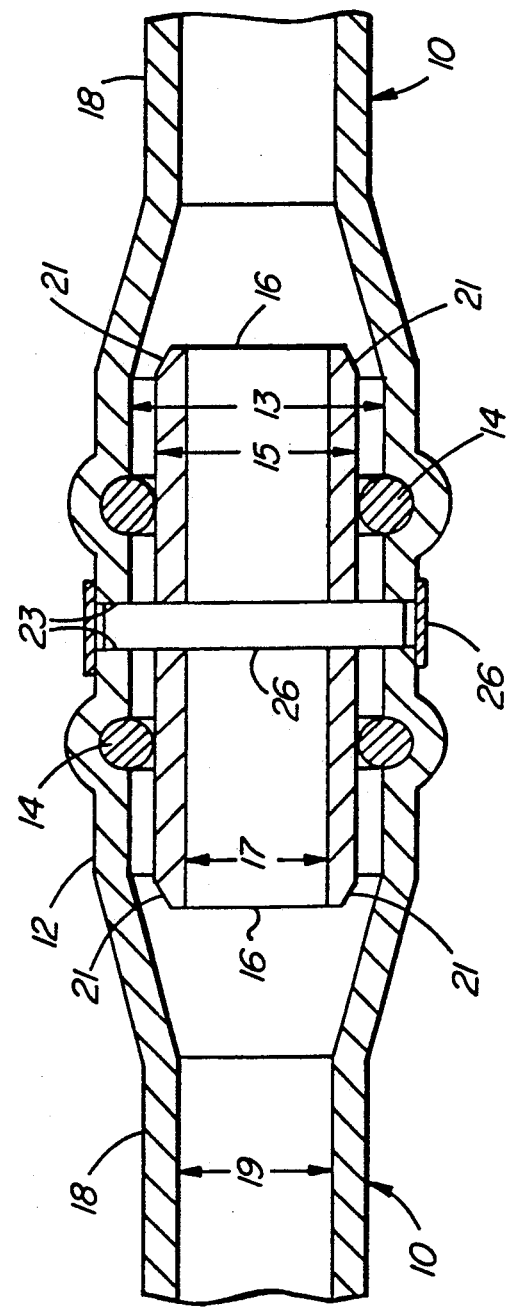
FIG. 5, a cross-section of bell, bell and nipple gasket-sealed joint according to the present invention, additionally showing bearing ring and dirt shield tape.

As seen in FIG. 5, the inside diameter 17 of nipple 16 is equal to the inside diameter 19 of the AWWA Standard C-900 watermain barrel 18.

The outer diameter 15 of the nipple 16 is less than the inside diameter 13 of bell 12, so that the nipple 16 will fit inside the mouth of bell 12, and snug up against gasket 14 for a fluid-proof seal.

An assembled coupling is illustrated in FIG. 4, and in FIG. 5. Standard commercially available straight pipe is commonly sold, and has the diameter sizes required in nipples 16. Nipples 16 are also provided with a bevel on both ends 21 (see FIG. 5) and the provision of such bevels is also readily available commercially. The suggested bevel is about 15 over one inch.

Figure 8:
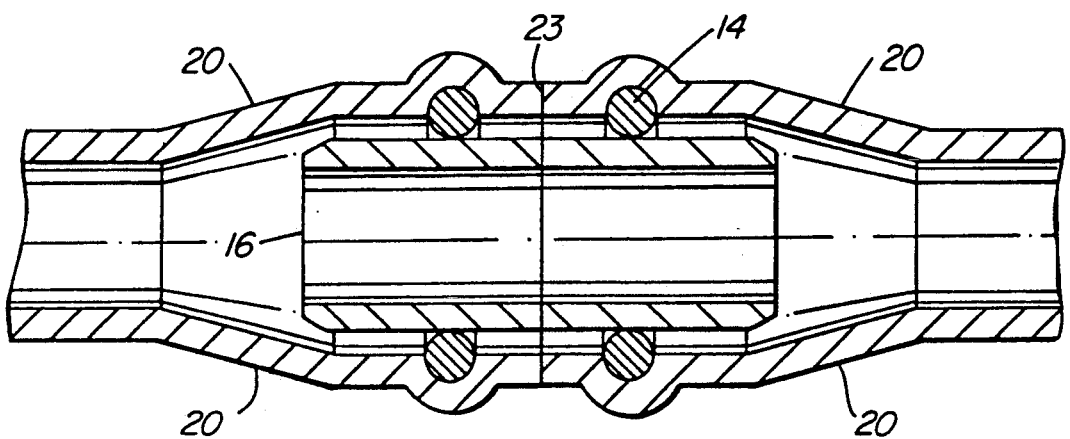
FIG. 8, a cross-section of bell, bell and nipple gasket-sealed joint according to the present invention.

Referring to FIG. 8, the maximum length of the nipple 16 is calculated such that it is less than the distance between the sloping shoulders 20 of the two opposing bells 12, so that, as indicated in FIG. 8, if the nipple is over-inserted into the one bell during installation such that a bevelled end 21 thereof contacts the inside surface of sloping shoulder 20, the other end of the nipple will not contact the opposing shoulder. Thus, the longitudinal load will still be borne between bell-mouth faces 23, and nipple 16 will not be broken or deformed. Further, the nipple is provided with a minimum length, also illustrated in FIG. 8, so that if the nipple is over-inserted to the left, as illustrated in FIG. 8, the nipple must be long enough so that its unbevelled outer surface extends beyond gasket 14 in opposing bell 20. This ensures a fluid-tight seal even though the nipple 16 has been over-inserted.

The inventor has devised three further versions of the invention involving the contact of the opposing bell-faces 23; these will be applicable in different situations. Since trenchless installation of the pipeline is identical for all variants, they will be described now and the common installation procedure afterwards.

It will be understood that relative movement between bell-faces 23 during push or pull installation may result in abrasion. Though likely insufficient to cause damage because bell faces of standard commercially-produced pipe bells are commonly flat, the presence of high spots causing point-loads cannot be discounted. Therefore, in a second version of the invention, referring to FIG. 5, an annular bearing-ring 26 is provided between the bell-mouth faces 23, positioned over the nipple 16. Bearing-ring 26 can be fashioned by cutting rings ½" and ¾" wide from suitably sized pipe of polyethylene, PVC, or other suitable material. Rings with inside diameter dimensions to fit closely over C-900 and D3034 PVC nipples 16 and with outside diameter 15 dimensions sufficient to form an ample bearing surface between bell-faces may be cut from standard ASTM F714 polyethylene pipe. Finally, a layer of adhesive tape 26, standard duct tape, is to be applied around the outside of the joint, to prevent dirt from entering the coupling while the pipe is being pushed into place.

Figure 6:
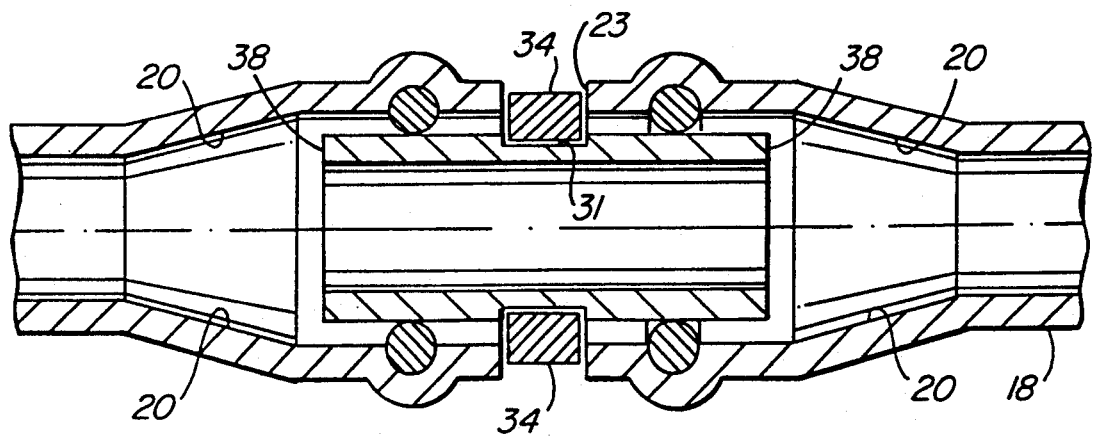
FIG. 6, a cross-section of bell, bell and nipple gasket-sealed joint according to the present invention, additionally showing grooved anchored nipple.
Figure 7:
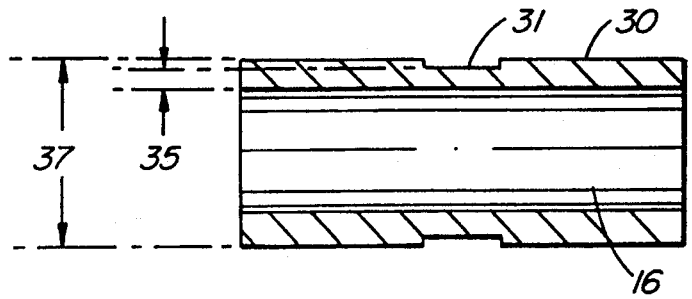
FIG. 7, additional cross-section of nipple according to the present invention shown in FIG. 6, clearly exhibiting radial and insert dimension.

In the third version, referring to FIGS. 6 and 7, an annular groove 31 is machined into the outer surface 30 of nipple 16, and an annular retainer ring 34 is fashioned so that it fits closely within groove 31. Retainer ring 34 also functions as a bearing ring, and longitudinal force is again transmitted from bell-mouth face to bell-mouth face through the retainer ring 34. In this manner, the nipple 16 is entirely prevented from movement during coupling assembly and service, and so cannot contact bell-shoulders 20; yet the nipple 16 bears none of the installation load. In this version, nipple 16 is fashioned from pipe which is thicker than the thickness of barrel pipe 10. Thus, after groove 31 has been machined in the outer wall of nipple 16, the remaining thickness of wall 35 of nipple 16 is still as great as the wall thickness of bell-pipe barrel 18. In the example being described, for installation of AWWA C-900 Class 100 pressure pipe, nipples 16 are fashioned from Class 150 or 200 standard pipe; for Class 150, nipples 16 are Class 200. Retainer ring 34 is made of PVC or polyethylene or other pipe of appropriate outer and inner diameters, similar to the bearing ring 26 of FIG. 5, but with two differences: 1) the inner dimension is now calculated to fit snugly into groove 31, as seen in FIG. 6, and so in practice is thicker than the bearing ring 26 of FIG. 5; and 2) a slit is cut in retainer ring 34, parallel to the axis of the pipe from which retainer ring 34, so that ring 34 is capable of expansion, when it is slidably placed over nipple 16, and then to be snugly received in the groove of nipple 16.

Figure 14:
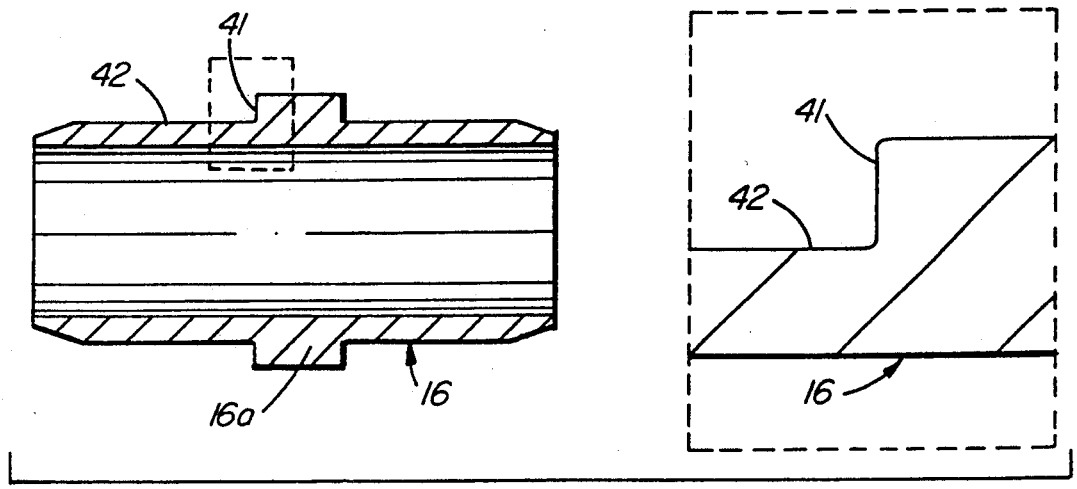
FIG. 14, cross-section of molded nipple with integral bearing and anchor ring, according to the present invention, with detail.
Figure 15:
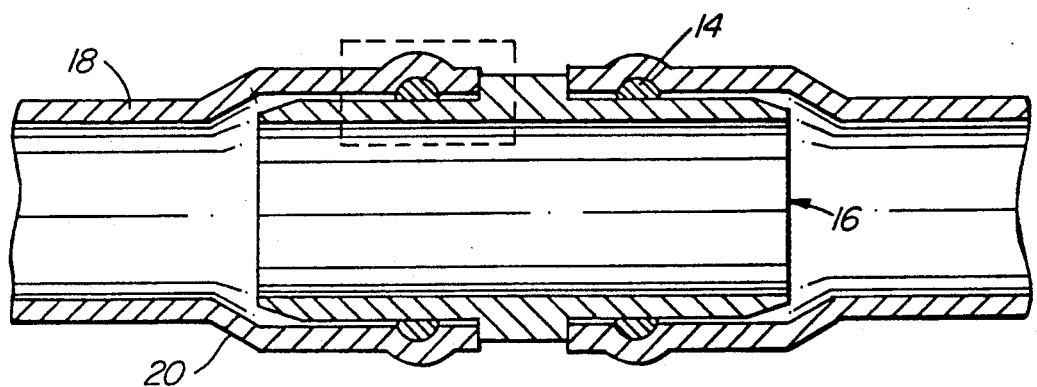
FIG. 15, cross-section of a bell, bell and nipple gasket-sealed joint according to the present invention, showing molded nipple with integral bearing and anchor ring.
Figure 16:
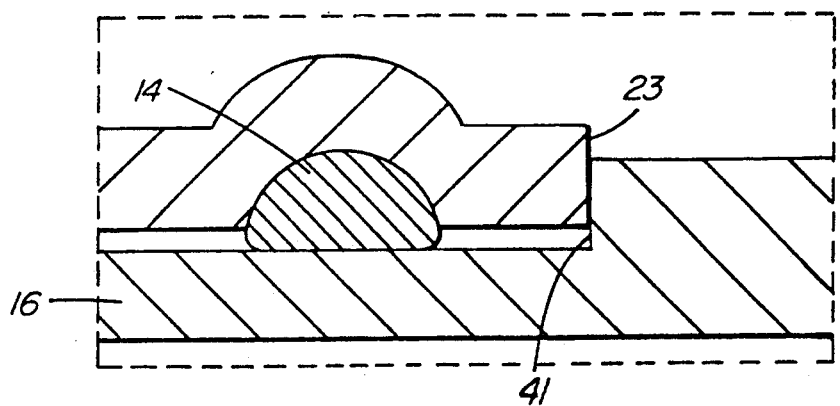
FIG. 16 is a detail, in enlarged scale of a bearing ring butted against a bell surface.
Figure 17:
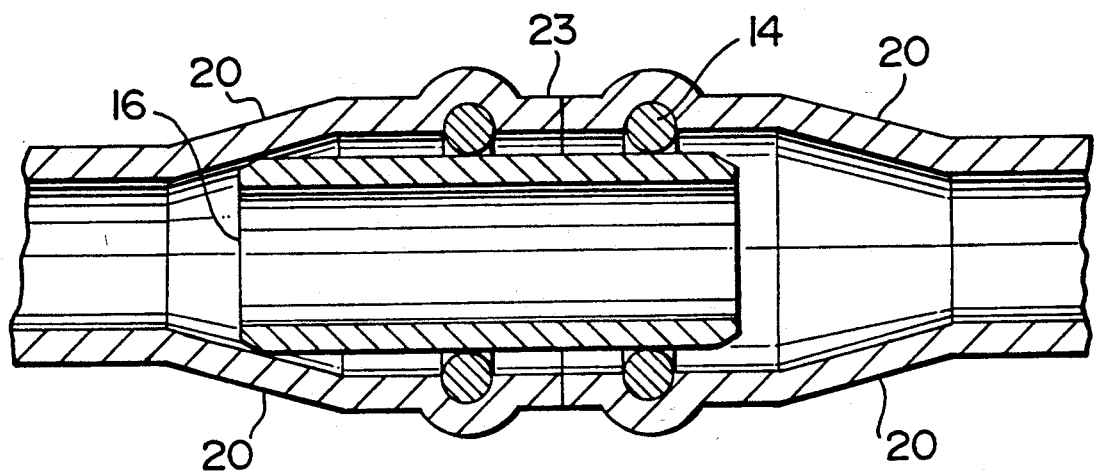
FIG. 17 is a cross-section of bell, bell and nipple gasket-sealed joint shown in FIG. 8, showing the nipple over-inserted into one of the bells.

In the fourth and final version, referring to FIGS. 14 and 15, the nipple 16 is provided with a unitary bearing and anchor ring 16a. This embodiment of nipple 16 is specifically manufactured for this application. If nipple 16a of the embodiment of FIGS. 14 and 15 is made of PVC, it is conveniently moulded. As seen in FIG. 14, the faces 41 of bearing ring 16a are flat, and project away from the outside wall of nipple 16, at an an angle of 90 degrees. As seen in FIG. 16, a standard bell face 23 will butt squarely against a bearing face 41 of nipple 16. The outside and inside diameters of nipple 16 are as previously described, that is, equal to the outside and inside of diameters of pipe body 18. As earlier described, tape may be applied around the point of union of nipple 16 and bell-faces 23.

To install all versions, known pushing or pulling (indirect pushing) procedures are used for the various trenchless situations, including: trenchless pipeline replacement (TRS, PIM, Expand-a-Line system); slip lining (installing a new pipeline into an old existing pipeline); pipe-jacking (pushing a pipeline into a bored tunnel).

Figure 9:
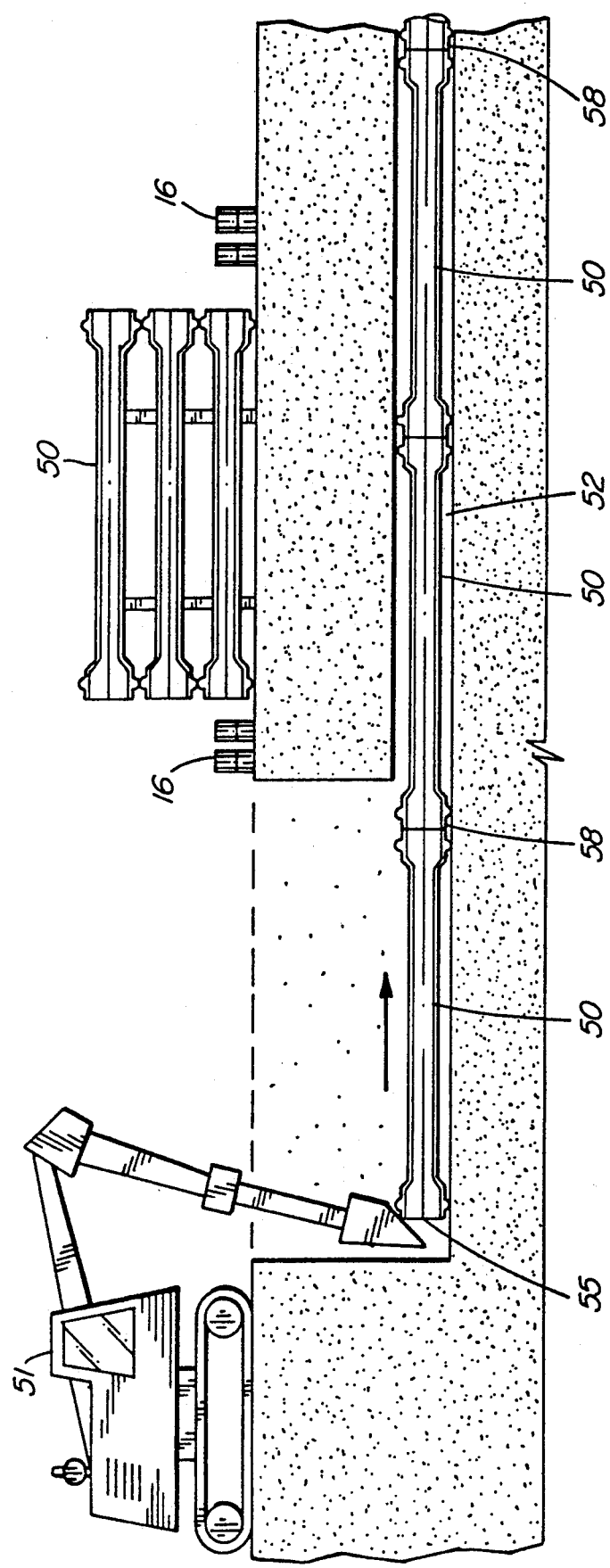
FIG. 9, simple push trenchless installation method for pipes joined according to the present invention.
Figure 10:
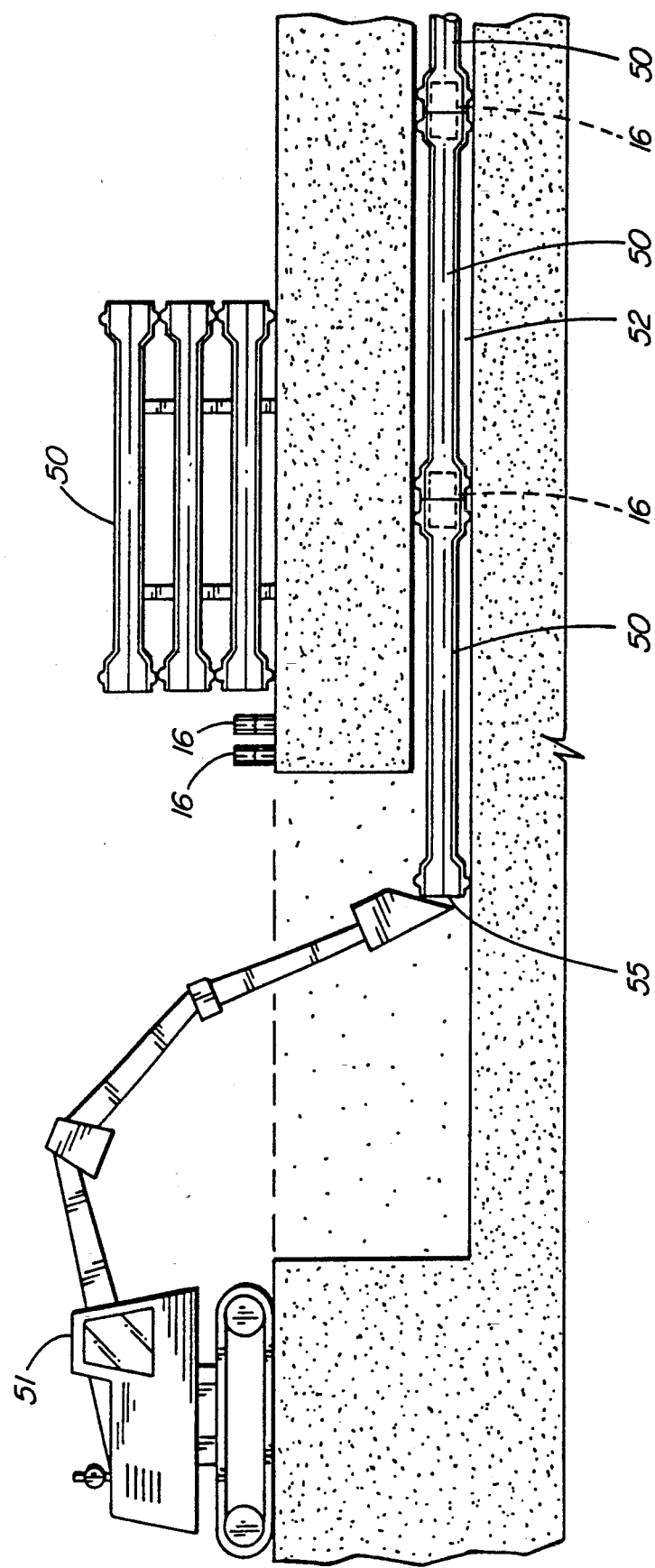
FIG. 10, simple push trenchless installation method for pipes joined according to the present invention.

For example, in FIG. 9 simple push installation is shown. BXB pipes 50 (bells on both ends) are shown stacked above ground and in tunnel 52. Nipples 16 are stacked above ground awaiting installation. Pipes and nipples underground in tunnel have already been joined as per the present invention in a BNB (Bell-nipple-Bell) coupling indicated generally as 58. A backhoe 51 is in position to push end 55 of the most recently positioned pipe. As the backhoe pushes, FIG. 10, all pipes move into the tunnel, and nipples 16 are isolated from longitudinal pushing force, which is transmitted through bell-faces in the coupling, as previously described, and shown in FIGS. 4, 5, 6, 8 and 15.

Figure 11:
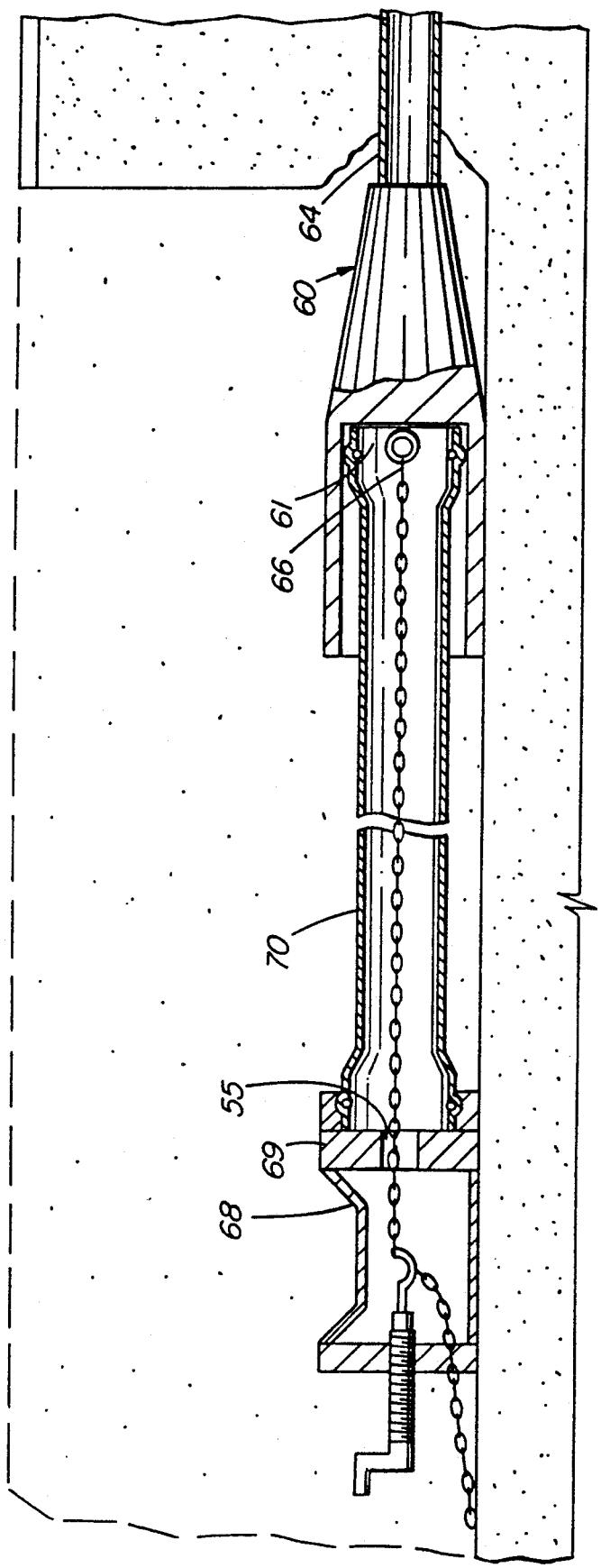
FIG. 11, pulling or indirect pushing installation method for pipes joined according to the present invention.
Figure 12:
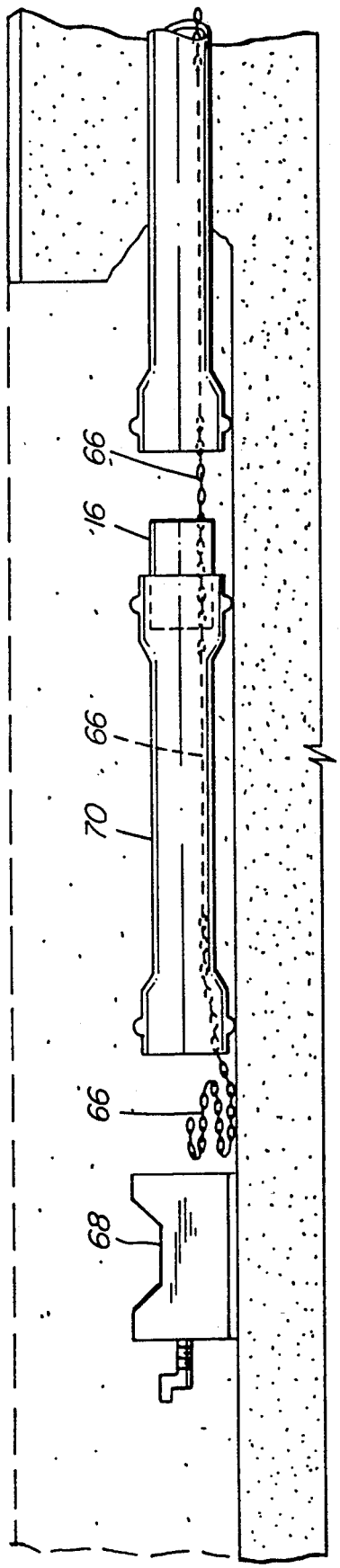
FIG. 12, pulling or indirect pushing installation method for pipes according to the present invention, showing components exploded.
Figure 13:
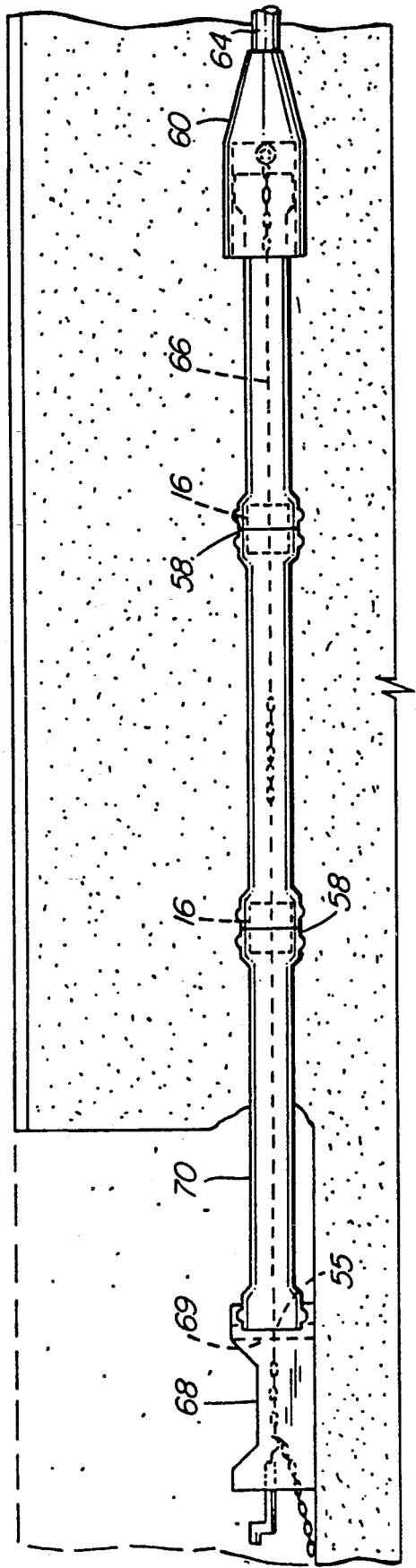
FIG. 13, pulling or indirect pushing installation method for pipes jointed according to the present invention, showing full length of operation.

One example of another common installation technique, pulling (indirect pushing) is illustrated in FIGS. 11, 12 and 13. A pipeline replacement tool, indicated generally as 60, surrounds the bell 61 of the first pipe being pulled; in this case over an old existing pipeline 64. Chain 66 attached to the back of the tool runs inside the new pipe to a pushing head 68 immediately behind the most recently added pipe 70 in the pipeline. As the pipeline replacement tool 60 (or a tunnelling tool or boring machine) pulls the chain forward, longitudinal force is applied from thrust plate 69 to end surface 55 of this most recent pipe. The entire pipeline moves into the tunnel, as shown in FIG. 13. Pushing force is born by pipeline identically to previous example using backhoe push, excepting only that in this case force is applied from thrust-plate 69 onto end 55 of the last pipe, instead of from backhoe shovel. Thus, force moves longitudinally through BNB couplings indicated generally as 58, and nipples 16 are isolated and as previously described, have no chance of damaging coupling. This indirect pushing method was the one actually used with the invented coupling at installations in Calgary, Alberta and worked well.

The foregoing is by way of example, and the invention should be limited only by the scope of the appended claims.

What I claim is:

1. A pipe coupling apparatus, comprising:
   a) a plurality of pipes each including a body section provided with an annular receptacle at the ends thereof;
   b) said receptacle including a sloping shoulder for connection with said body section;
   c) said receptacle having an inside diameter larger than the inside diameter of said body section;
   d) said receptacle having an inside diameter larger than the inside diameter of said shoulder;
   e) at least one nipple having bevelled edge portions at the ends of said nipple for coupling two pipes;
   f) said nipple having an outside diameter smaller than the inside diameter of said receptacle such that said nipple can be inserted within said receptacle;
   g) said nipple having a length such that upon insertion in two opposed receptacles only one end of said nipple engages with the corresponding shoulder portion;
   h) sealing means for coupling said nipple with said pipes;
   i) said receptacle including a radially extending end face; and
   j) wherein the end faces of two opposed receptacles remain free upon assembly of the apparatus and come in direct engagement with each other when a longitudinal pushing force is applied.

2. The pipe coupling apparatus of claim 1, wherein:
   a) said sealing means comprises an annular ring disposed in said receptacle.

3. The pipe coupling apparatus of claim 1, wherein:
   a) the length of said nipple, excluding the bevelled edge portions thereof, is longer than the distance between the sealing means of two opposed receptacles.

4. A pipe coupling apparatus, comprising:
   a) a plurality of pipes each including a body section provided with an annular receptacle at the ends thereof;
   b) said receptacle including a sloping shoulder for connection with said body section;
   c) said receptacle having an inside diameter larger than the inside diameter of said body section;
   d) said receptacle having an inside diameter larger than the inside diameter of said shoulder;
   e) at least one nipple having a body section and bevelled edge portions at the ends of said nipple for coupling two pipes;
   f) said body section of said nipple having a constant outside diameter smaller than the inside diameter of said receptacle such that said nipple can be inserted within said receptacle;
   g) said nipple being shorter in length than the combined lengths of two opposed receptacles;
   h) sealing means for coupling said nipple with said pipes;
   i) said receptacle including a radially extending end face;
   j) said nipple including an annular load bearing means having a diameter larger than the diameter of said body section of said nipple;
   k) said load bearing means defining opposed side surfaces; and
   l) said side surfaces of said load bearing means directly engaging with the corresponding end faces of two opposed receptacles.

5. The pipe coupling apparatus of claim 4, wherein:
   a) said load bearing means is formed integral with said nipple.

6. The pipe coupling apparatus of claim 4, wherein:
   a) said side surfaces of said load bearing means form right angles with the external surface of said nipple.

7. The pipe coupling apparatus of claim 4, wherein:
   a) the diameter of said load bearing means is smaller than the outside diameter of said receptacle.

8. The pipe coupling apparatus of claim 4, wherein:
   a) said sealing means comprises an annular ring disposed in said receptacle.

9. The pipe coupling apparatus of claim 4, wherein:
   a) the length of said nipple, excluding the bevelled edge portions thereof, is longer than the distance between the sealing means of two opposed receptacles.

* * * * *